United States Patent
Shaffer et al.

[11] Patent Number: 5,978,470
[45] Date of Patent: Nov. 2, 1999

[54] SIGNAL-PROCESSING METHOD AND SYSTEM FOR OFF-HOOK NOTIFICATION

[75] Inventors: Shmuel Shaffer, Palo Alto; William J. Beyda, Cupertino, both of Calif.

[73] Assignee: Siemens Information and Communications Networks, Inc., Boca Raton, Fla.

[21] Appl. No.: 08/856,563

[22] Filed: May 14, 1997

[51] Int. Cl.[6] .................................................. H04M 3/00
[52] U.S. Cl. .......................................... 379/377; 379/387
[58] Field of Search ................................... 379/377, 387, 379/373, 375, 424

[56] References Cited

U.S. PATENT DOCUMENTS

| | | |
|---|---|---|
| 4,922,529 | 5/1990 | Kiel . |
| 4,998,271 | 3/1991 | Tortola et al. ............................ 379/32 |
| 5,390,249 | 2/1995 | Park ........................................ 379/393 |
| 5,606,593 | 2/1997 | Smith ...................................... 379/33 |
| 5,612,529 | 3/1997 | Vallelonga, Sr. et al. . |
| 5,612,997 | 3/1997 | Vallelonga, Sr. et al. ............. 379/393 |

*Primary Examiner*—Creighton Smith

[57] ABSTRACT

A signal-processing method and system for a telecommunications switch that supports a number of individually addressable telephones including transmitting ring signals to telephones that are determined to be in an inadvertent off-hook condition. The telecommunications switch is configured to transmit a first notification ring signal upon detecting that a particular telecommunications line is in a condition that indicates that the associated telephone is in the inadvertent off-hook condition. The first ring signal induces a ring condition that preferably is uniquely identifiable as indicating that the phone has been left off-hook. A second notification ring signal is transmitted if the phone is returned to the on-hook condition and an incoming call is directed to the telephone. Preferably, the second ring signal induces a uniquely identifiable ring condition indicating that an incoming call is directed to an off-hook telephone. Optionally, a third off-hook notification signal may be transmitted to the phone to generate an audible alert by means of a speaker in the earpiece of the telephone.

19 Claims, 3 Drawing Sheets

SIGNAL-PROCESSING METHOD AND SYSTEM FOR OFF-HOOK NOTIFICATION

BACKGROUND OF THE INVENTION

The invention relates generally to methods and systems for processing signals upon detection of an off-hook event and more particularly to the handling of off-hook events from a telecommunications switch of a telephone network.

DESCRIPTION OF THE RELATED ART

A conventional method for alerting persons that a telephone has been left physically off-hook is to transmit a "howler" signal from a telecommunications switch, such as a central office of a telecommunications network. In response to receiving the howler signal, the off-hook telephone generates an audible notification from the speaker in the earpiece of the telephone. In order to attract the attention of an individual, the audible notification is typically loud and consists of multiple tones. For example, a howler signal may include frequencies of 1400 Hz, 2060 Hz and 2600 Hz, modulated at a frequency of 5 Hz. However, single-frequency howler signals are also utilized.

The telecommunications switch is configured to detect when a telephone is off-hook. For wireline telephones, the telephone may be characterized by a voltage of approximately 48 volts when the receiver is in the on-hook position. On the other hand, the telephone may be characterized by a voltage of approximately 10 volts when the receiver is in the off-hook position. Consequently, the voltages along the telecommunications lines may be monitored to determine the operating conditions of the telephones supported by the telecommunications switch. Alternatively, current flow through the individual telecommunications lines may be monitored to detect off-hook events, since current increases when an on-hook phone is taken off-hook. The switch is also configured to determine when a supported telephone is in a "presumed" inadvertent off-hook condition. Often, a telephone that is off-hook, but presently inactive, is not inadvertently off-hook. A caller may be attempting to locate or recall the telephone number of interest. The transmission of a howler signal would unnecessarily utilize resources of the switch during such occasions. Therefore, there is typically a time element in concluding that a phone is inadvertently off-hook. For example, if no dialing activity occurs at a phone for one minute after detection that the voltage level at the phone has dropped from 48 volts to 10 volts, the transmission of the howler signal may be triggered. The conclusion that the condition is inadvertent may vary with the circumstances, e.g., there may be a longer period of time for situations in which a party is presumably between two calls, so that if the second call is not initiated within a network-configured period of time, it is only then presumed that the off-hook condition is inadvertent.

The audible notification via the speaker of the off-hook phone alerts persons within the vicinity. The phone can then be placed in the on-hook condition. This provides an advantage to users, since incoming calls are refused with a busy signal when the phone is off-hook. Moreover, the process reduces the waste of valuable network resources, such as dialing registers and processing power.

The howler signal is transmitted for a preselected duration, since the transmission occupies network resources. If a person is not within hearing distance of the audible notification, the telecommunications line remains idle until the switch senses that the telephone has returned to the on-hook condition. Consequently, a telephone which has been left off-hook may remain disabled with respect to receiving incoming calls for an extended period of time.

There are known devices which may be added to a telephone to reduce the difficulties associated with inadvertent off-hook events. U.S. Pat. No. 4,998,271 to Tortola et al. describes a telephone accessory that is connected between a telephone line and a local telephone. The accessory utilizes the howler signal received from the central office to determine that the telephone is both off-hook and inactive. In response to detecting the inactive off-hook condition, an alarm circuit generates an audible alarm through a speaker. A disconnect circuit within the accessory removes the local telephone from the loop, so that the off-hook condition at the local telephone is transparent to the central office. A ring detector within the accessory detects an incoming call over the phone line and sends an audible signal to alert a user that a call is being directed to the local phone. When the local telephone is returned to the on-hook condition, the phone is reconnected to the phone line. In effect, the telephone accessory of Tortola et al. operates to alert a user that the phone is off-hook and that an incoming call is being directed to the user, but the accessory remains idle until the central office activates the accessory by transmission of the howler signal.

U.S. Pat. No. 5,390,249 to Park is another add-on circuit that includes an electrically activated hook switch that overrides the conventional mechanically activated hook switch during off-hook events. Similar to Tortola et al., the override state is triggered by reception of a signal from the central office of the telephone network. If the local telephone receiver is inadvertently left in the off-hook condition, a line-parking signal from the central office deactivates a relay, causing the disconnection of the mechanically activated hook switch from the telephone line. The operation of the electrically activated hook switch allows reception of an incoming call during the off-hook event.

U.S. Pat. Nos. 5,606,593 to Smith and 5,612,997 to Vallelonga, Sr. et al. describe add-on devices that are time-triggered rather than being triggered solely by reception of a signal from the central office. For Smith, the user sets a time period for automatically returning an off-hook telephone to an on-hook condition. The apparatus electrically hangs up the telephone and allows normal handling of outgoing and incoming calls at other extensions of the telephone line. In some embodiments, the incoming calls may ring-in to the telephone having the inadvertently off-hook handset. The Vallelonga, Sr. et al. device includes a similar timer, but may also include tone detectors that allow the add-on device to be triggered by reception of a howler signal or other off-hook notification signals generated by the central office that supports the local telephone.

The add-on devices operate well for their intended purposes, but increase the cost of the telephone. Moreover, the devices require a one-to-one correspondence between telephone lines and the devices.

What is needed is a system and method for providing signal processing during off-hook events such that off-hook notification is enhanced and network resources are conserved.

SUMMARY OF THE INVENTION

A telecommunications-wide system implements a signal-processing method at a telecommunications switch level. The telecommunications lines that connect the switch to individually addressable telephones are monitored to detect the existence of preselected conditions along the telecommunications lines. If a preselected condition is satisfied, an inadvertent off-hook event is presumed for the telecommunications line. In response to detection that a presumed inadvertent off-hook event exists, the telecommunications switch transmits ring signals, i.e., signals which induce ringing at the off-hook telephone.

While not critical, the preferred embodiment includes first and second ring signals. The first ring signal is an off-hook notification signal that is directly triggered by the detection of the preselected condition along the telecommunications line associated with the telephone. The first ring signal is intended to alert a person of the condition. The first ring signal is limited to a set period of time, so that network resources are conserved if a person is not within hearing distance of the telephone. The telecommunications line is tagged as having an off-hook status until the phone is returned to the on-hook position.

The second ring signal is a call-notification signal that is transmitted when the telecommunications line is assigned the off-hook status and an incoming call is directed to the associated phone. Thus, the user of the telephone is alerted to incoming calls during inadvertent off-hook events.

In the preferred embodiment, the first and second ring signals are distinctive. That is, each of the first and second ring signals induces a unique ring condition at the phone. The distinction may be with respect to a ring cadence, volume, or both. A "ring" is defined as including any of the sounds or other indications that are implemented at telephones to notify persons of an incoming call. Such sounds may be generated by bells, tone generators, vibrational devices, and other indicators.

Optionally, the first ring signal is transmitted in conjunction with a conventional howler signal that generates an audible notification from the speaker of the telephone. For analog phones, the ring signals may be ringing voltages sent via the telecommunications line to cause the phone to ring with a unique cadence. Within a digital environment, new protocol elements may be transmitted. For example, the first ring signal may be an indication that, "The phone has been left off the hook," while the second ring signal may be a protocol element indicating an "incoming call."

DETAILED DESCRIPTION

Figure 1:
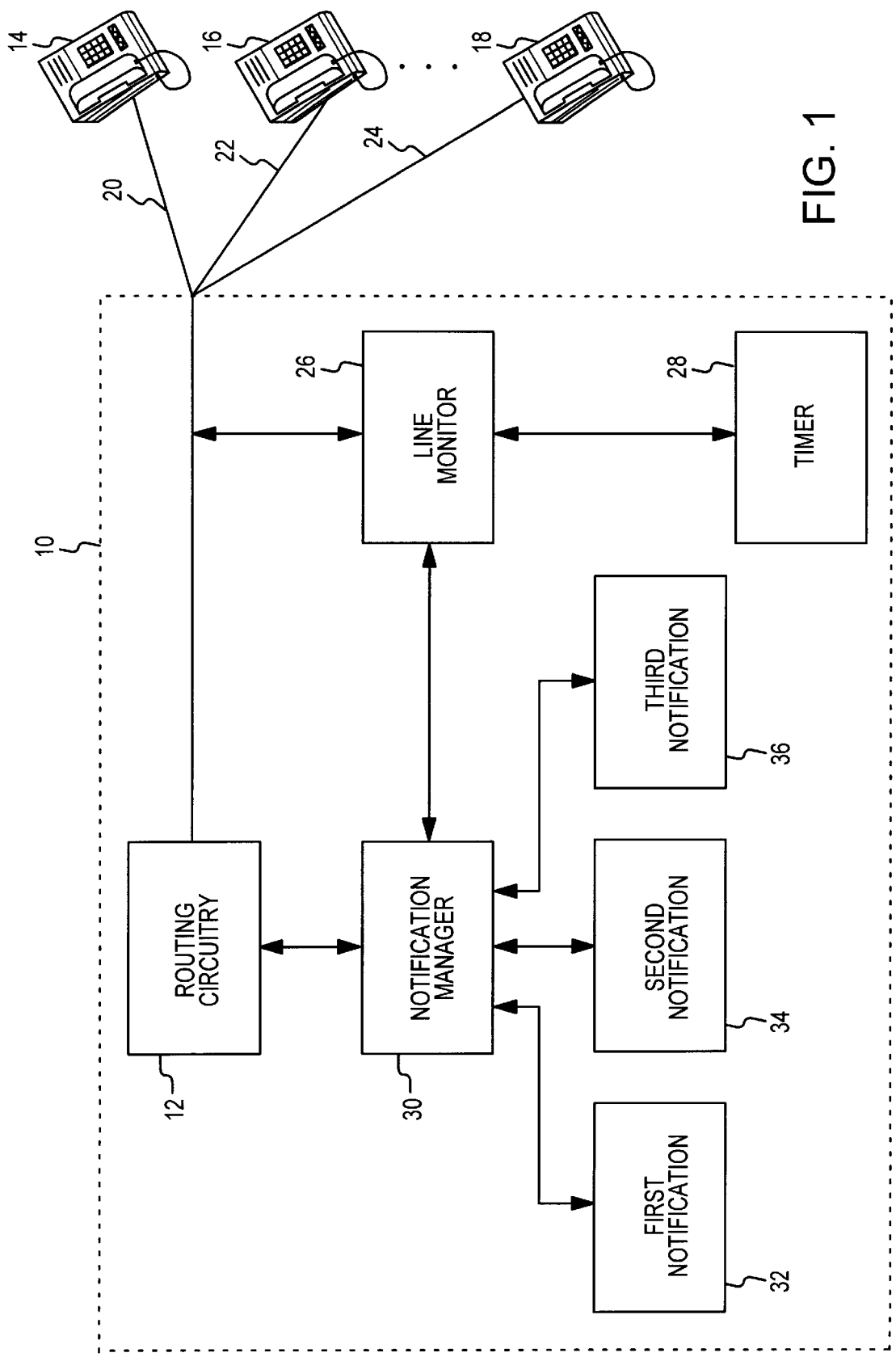
FIG. 1 is a block diagram of a telecommunications network in accordance with the invention.

With reference to FIG. 1, a telecommunications switch 10 of a telephone network is shown as including routing circuitry 12. In the preferred embodiment, the switch 10 is a central office. However, the invention may be utilized in other applications in which a switch supports a number of individually addressable telephones 14, 16 and 18. For example, the telecommunications switch 10 may be circuitry of a private branch exchange (PBX).

The telecommunications switch 10 is connected to the telephones 14, 16 and 18 via telephone links 20, 22 and 24. The type of link is not critical to the invention. Each link may be a wireless connection, a wire connection, or a fiberoptic cable, as examples.

It is well known in the art that each telephone 14, 16 and 18 has an on-hook state and an off-hook state. In the on-hook state, the telephone is accessible to incoming calls. Typically, an off-hook state results in refusal of an incoming call with a busy signal being transmitted to the called party. However, the signal-processing system and method described below allow the call-notification to pass through to an off-hook telephone.

The routing circuitry 12 links two telephones 14, 16 and 18 supported by the switch 10 or links one of the telephones with a telephonic device supported by another switch. The routing circuitry is well known in the art and the specific circuitry is not critical to the invention. In addition to the routing circuitry, the switch 10 includes a line monitor 26. The line monitor is utilized to detect a presumed inadvertent off-hook event at one of the supported telephones. For example, if the telephone links 20, 22 and 24 are wireline connections that are at approximately 48 volts when the telephones are all in the on-hook positions, but are at approximately 10 volts when the telephones are off-hook, the line monitor may operate by continuously or periodically polling the individual links to determine voltage levels. As an alternative, line current may be monitored to determine whether the phone associated with a link is on-hook or off-hook. There is a detectable increase in line current when the phone is taken off-hook. If a particular phone is taken off-hook, the line monitor will detect the voltage and/or change at the link associated with a particular phone. A timer 28 is used in the determination of whether the off-hook event is inadvertent. For example, the switch 10 may be configured to presume that the off-hook event is inadvertent if no dialing activity occurs within one minute after detection of the off-hook condition. This configuration, in order to determine a "presumed" inadvertent off-hook event, may be implemented using conventional strategies for such configurations.

The telecommunications switch 10 also includes a notification manager 30 that is activated during presumed inadvertent off-hook events. The notification manager may be implemented in software, but is responsive to the line monitor 26 and the routing circuitry 12. The notification manager is used to selectively trigger transmissions of preestablished off-hook notification signals. The notification signals are contained in memory. In FIG. 1 the memory is shown as being divided into components for containing a first notification signal 32, a second notification signal 34, and a third notification signal 36. The first notification signal is a ring signal that activates a ring detector and a ringing mechanism at the off-hook telephone upon first detection of the presumed inadvertent off-hook event.

Figure 2:
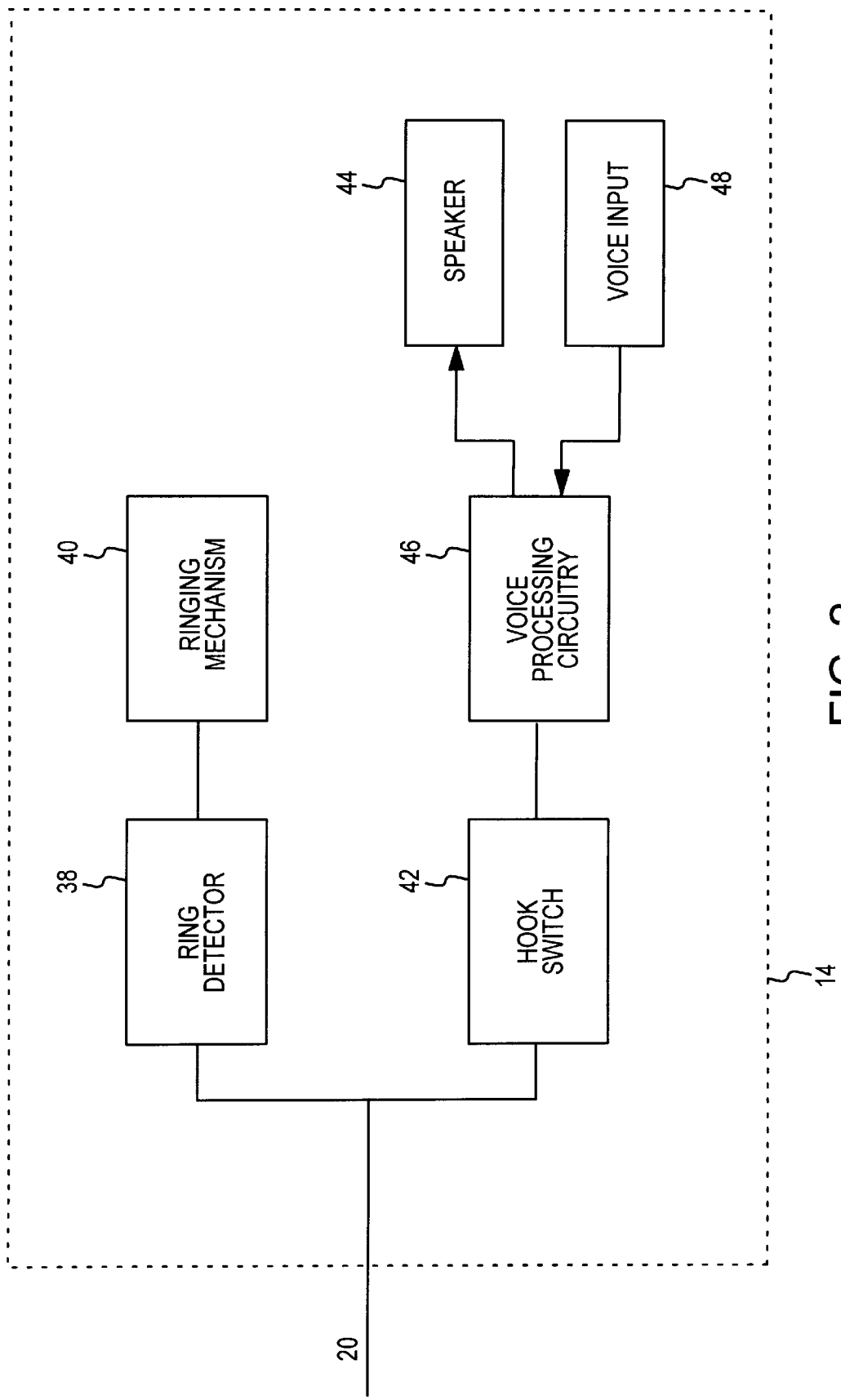
FIG. 2 is a block diagram of components of a conventional telephone.

FIG. 2 illustrates a conventional telephone 14 having a ring detector 38 and a ringing mechanism 40. The ring detector 38 is responsive to a ring signal and activates the ringing mechanism 40. The ringing mechanism may be a bell, a tone synthesizer, a vibrational device, or any other known indicator for alerting a person within the vicinity of the telephone 14. For the hearing impaired, the "ringing mechanism" may be a visual display.

Within an analog environment, the first off-hook notification ring signal is a ringing voltage that is sent along the telephone link 20 of the off-hook phone 14 for a configurable period of time. Preferably, the off-hook notification signal induces a unique ring condition, such as a special cadence and/or volume to indicate that the phone has been left off of the hook, i.e., the hook switch 42 of the telephone is presently closed. For some phones, a difference in tone or volume may be inherent, since the change in line impedance as a result of the off-hook condition will result in a "ring" that is different than the ring when the phone is on-hook.

Typically, the line impedance is greater during off-hook events, causing a greater attenuation of the ring signal. Within a digital environment, the first notification signal may be a new protocol element that is transmitted to indicate that, "The phone has been left off the hook." The notification signal is transmitted for a configurable period of time and preferably includes a special cadence, tone, and/or volume.

Optionally, a third off-hook notification signal 36 is transmitted in conjunction with the first notification signal 32. This optional signal generates an audible notification via the speaker 44 of the telephone 14 of FIG. 2. The speaker is connected to the voice processing circuitry 46 of the telephone and may be contained within the earpiece of the telephone receiver. An exemplary third off-hook notification signal is the conventional howler signal. Because the hook switch 42 is in the electrically closed state when the phone 14 is off-hook, the telephone link 20 is connected to the processing circuitry 46 to audibilize the howler signal by means of the speaker. As shown in FIG. 2, the telephone also includes a voice input device 48, such as a microphone contained within a handset of the telephone.

The notification manager 30 of FIG. 1 may be configured to retransmit either or both of the first and third off-hook notification signals 32 and 36 at preselected intervals. For example, a timer may be included to repeat the transmission of the first notification ring signal 32 every five minutes. However, this is not critical to the invention.

The second off-hook notification signal 34 is also a ring signal. This second ring signal is transmitted in response to detection that an incoming call is being directed to the off-hook telephone 14. Thus, rather than returning a busy signal to a calling party when the phone is in an inadvertent off-hook condition, the notification manager 30 induces a second ring condition at the telephone. In the case of an analog phone, a ringing voltage may be sent along the associated telephone link 20 to cause the phone to ring for a configurable period of time. Preferably, the second ring condition is unique with respect to either cadence or volume, indicating that the phone has been left off the hook, but an incoming call is arriving. The called party can then flashhook to be connected. In the case of a digital phone, an "incoming call" protocol element may be transmitted as the second notification signal. The protocol element induces ringing for a configurable period of time with a unique cadence, tone, and/or volume, indicating that the caller is calling, even though the phone is off the hook. The called party can flash-hook to be connected. The ringing for a configurable period of time is not critical to the invention, since the phone may be allowed to ring until the calling party disconnects, if the called party does not answer the second ring condition.

In operation, the telecommunications switch 10 is configured to identify a condition or conditions under which it is presumed that a telephone 14, 16 and 18 is inadvertently left off-hook. This is shown at step 50 in FIG. 3. The line monitor 26 is connected to each of the telephone links 20, 22 and 24 to monitor wireline conditions. In the wireline application, the individual links may be monitored to detect voltage and/or current variations indicative of the hookswitch status of the associated telephones. Detection of a voltage or current variation that indicates that the phone has been taken off-hook may trigger the timer 28. The step 50 of configuring the switch includes establishing a time period for awaiting dial activity. If no dialing activity is detected during the selected time period, it is "presumed" that the off-hook condition is inadvertent.

Figure 3:
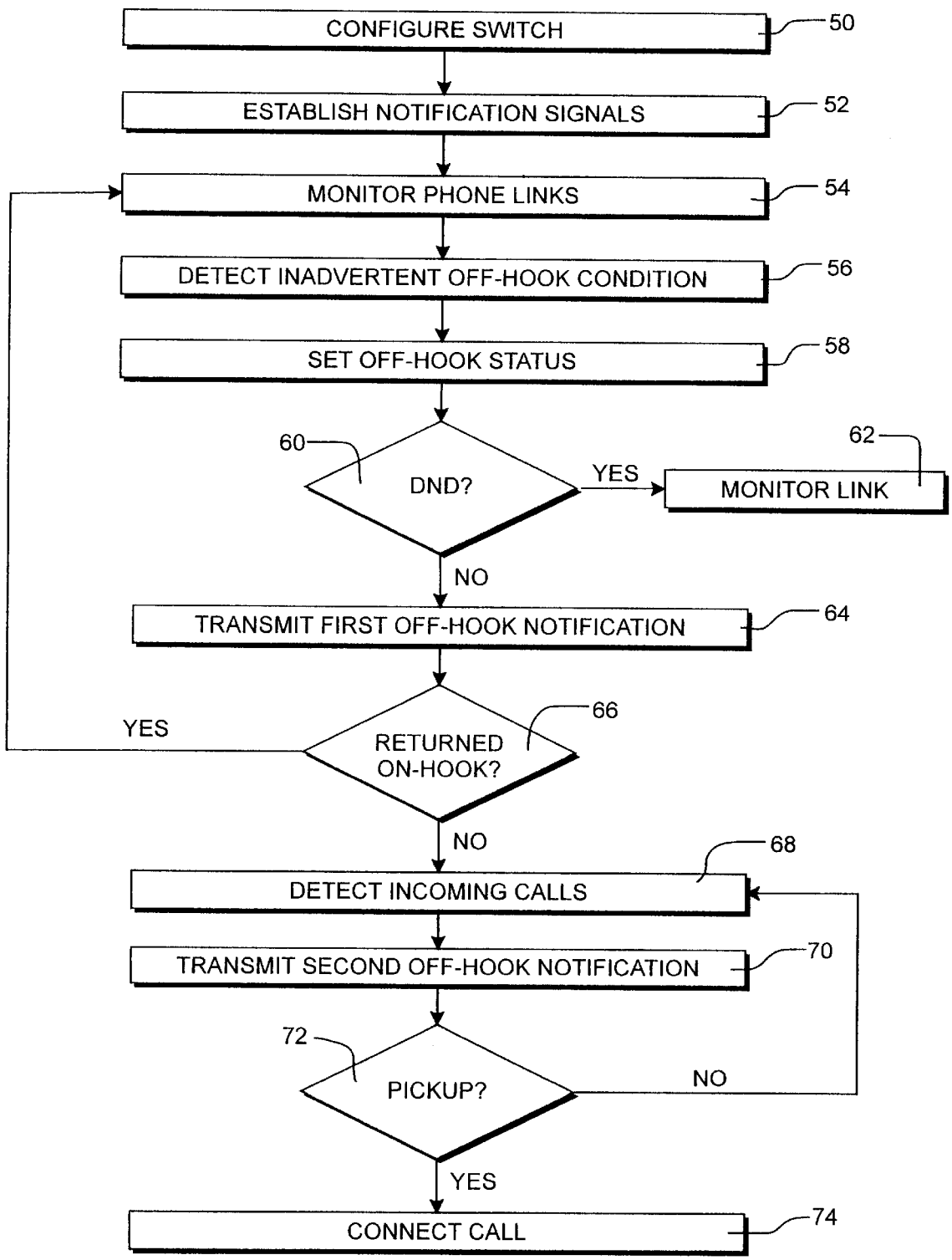
FIG. 3 is a process flow for implementing the signal-processing method in accordance with the invention.

Step 52 in FIG. 3 is also a step of configuring the switch 10. The three off-hook notification signals 32, 34 and 36 of FIG. 1 are stored in memory. As previously noted, the first notification signal is a ring signal that is transmitted upon detection of the presumed inadvertent off-hook condition, the second notification signal is a ring signal transmitted during an off-hook condition if an incoming call is directed to the phone, and the third notification signal is an optional howler signal that induces an audible notification via the speaker in the earpiece of the off-hook phone.

In step 54, the line monitor 26 is activated. The monitoring process may be continuous or may be a periodic polling process. Conventional techniques may be employed in carrying out the step 54 of monitoring the phone links 20, 22 and 24. The monitoring techniques will depend at least partially upon the type of links, e.g., wireline connections or wireless connections.

In step 56 of FIG. 3, a presumed inadvertent off-hook condition is detected. Preferably, the detection causes the appropriate telephone link, e.g., link 20, to be tagged with an off-hook status. Setting the off-hook status is shown at step 58. While not critical, users at the various phones 14, 16 and 18 preferably have the option of intentionally leaving a telephone off-hook without disturbance. For example, if a user desires privacy, there is preferably a mechanism for allowing the phone of the user to be left off the hook without receiving any of the notification signals stored at 32, 34 and 36 in FIG. 1. This may be accomplished by disabling the notification manager 30 with respect to specific phones during particular times. The user may utilize a "do not disturb" (DND) feature that is common in the telecommunications art. At decision step 60, the telecommunications switch 10 determines whether the do-not-disturb mode has been activated. If so, the appropriate telephone link is monitored at step 62 to determine when the do-not-disturb mode is deactivated or the telephone has been placed in the on-hook position. The monitoring process at step 62 may be a periodic process that requires less network resources than the monitoring process implemented at step 54.

If the do-not-disturb feature does not exist or has not been activated at a telephone that is in a presumed inadvertent off-hook condition, the first off-hook notification ring signal is transmitted at step 64. As previously noted, in the analog environment, the ring signal may be a ringing voltage and may induce a uniquely identifiable ring condition at the appropriate telephone. As previously noted, off-hook ring conditions are inherently different than on-hook ring conditions for some phones, since the difference in line impedance during on-hook and off-hook events results in dissimilar effects upon the transmitted ring signals. In the digital environment, the first ring signal may be a protocol element that induces a ring condition that uniquely identifies the off-hook condition. The third notification signal 36 of the telecommunications switch 10 may be transmitted either prior to, simultaneously with, or following the transmission of the first off-hook notification ring signal.

At decision step 66, the determination is made as to whether the telephone has been returned to the on-hook position. If yes, the process returns to the monitoring step 54 for the telephone link, e.g. link 20, associated with the telephone. For situations in which the telephone is not returned to the on-hook condition, the process may optionally return to step 64 on a periodic basis in order to retransmit the first notification ring signal. For example, the first ring signal may be transmitted every five minutes and may have a duration of fifteen seconds.

While not shown in FIG. 3, the decision step 66 is an ongoing process. That is, the telecommunications switch 10 of FIG. 1 continuously or periodically checks the status of the line associated with the off-hook telephone to determine whether the telephone has been returned to an on-hook condition.

In step 68, the telecommunications switch detects the presence of an incoming call to the telephone which is left off the hook. The second notification ring signal 34 is then transmitted to the particular telephone. In the analog environment, the ring signal is a ringing voltage which preferably induces a uniquely identifiable ring condition at the telephone. In the digital environment, the second ring signal is a protocol element indicating an incoming call and preferably induces a uniquely identifiable ring condition.

If at decision step 72 it is determined that the user has not picked up the call, the process returns to step 68 of detecting incoming calls. Consequently, if a second incoming call is directed to the off-hook telephone, the second notification ring signal will be transmitted again at step 70. On the other hand, if the user picks up the telephone in response to the second notification ring signal, the call is connected at step 74. For example, the user may flash-hook in order to enable call connection.

While the invention has primarily been described as being utilized at a central office of the wireline telephone network, this is not critical. The process flow of FIG. 3 may be used in other applications, such as wireless phone networks and PBXs that support a number of individually addressable phones.

What is claimed is:

1. A signal-processing method for a telecommunications switch that supports a plurality of individually addressable telephones comprising steps of:
   selecting a condition along a telecommunications line for which an inadvertent off-hook event is presumed upon satisfaction of said condition;
   monitoring a plurality of telecommunications lines from said telecommunications switch to detect when said condition is satisfied along one of said telecommunications lines, thereby detecting a presumed inadvertent off-hook event at a telephone associated with said telecommunications line; and
   transmitting notification signals from said telecommunications switch to said telephone via said one of said telecommunications lines while said inadvertent off-hook event is presumed for said telephone, including transmitting a call-notification ring signal for ringing said telephone in response to an incoming call directed to said telephone.

2. The method of claim 1 wherein said step of transmitting said notification signals further includes transmitting an off-hook notification ring signal for ringing said telephone in response to said detection of said presumed inadvertent off-hook event.

3. The method of claim 2 wherein said step of transmitting said notification signals further includes forming said off-hook notification ring signal such that ringing at said telephone in response to receiving said off-hook notification is distinguishable from ringing at said telephone in response to receiving said call-notification ring signal.

4. The method of claim 3 wherein said step of transmitting said notification signals further includes forming said call-notification ring signal such that ringing at said telephone in response to receiving said call-notification ring signal is distinguishable from ringing at said telephone in response to receiving a ring signal when said telephone is in an on-hook condition.

5. The method of claim 3 wherein said step that includes forming said off-hook notification ring signal includes selecting a ring cadence indicative of said telephone being off-hook.

6. The method of claim 2 wherein said step of transmitting said off-hook notification ring signal includes transmitting a protocol element to a digital phone, said protocol element being specific to transmission upon detection of said presumed inadvertent off-hook event.

7. The method of claim 1 further comprising a step of assigning an off-hook status to said telecommunications line for which said condition is satisfied, said step of transmitting notification signals being limited to transmissions via telecommunications lines for which said off-hook status is assigned.

8. The method of claim 2 wherein said step of transmitting notification signals further includes transmitting a signal selected to generate an audible notification from a speaker of said telephone.

9. A signal-processing method for a switch of a telecommunications network of phones comprising steps of:
   configuring said switch to establish off-hook procedures, including defining conditions indicative of an off-hook event and including defining off-hook notification signals limited to use for said off-hook events;
   detecting occurrence of said conditions at phones of said telecommunications network;
   tagging a particular phone with an off-hook status upon detecting satisfaction of said conditions at said particular phone;
   inducing a first ring condition at said particular phone by transmitting a first off-hook notification signal to said particular phone, including limiting the duration of said first ring condition;
   inducing a second ring condition at said particular phone for each call directed to said particular phone while said off-hook status is set, including transmitting a second off-hook notification signal;
   monitoring said particular phone to detect when said particular phone is returned to an on-hook condition; and
   removing said off-hook status upon detection of said particular phone returning to said on-hook condition.

10. The method of claim 9 wherein said step of configuring said switch is a step of configuring a central office of said telecommunications network.

11. The method of claim 9 wherein said step of configuring said switch is a step of configuring a private branch exchange (PBX).

12. The method of claim 9 wherein said step of configuring said switch includes defining said first and second notification signals such that each of said first and second ring conditions is associated with a distinctive ring cadence.

13. The method of claim 9 further comprising a step of transmitting a howler signal to said particular phone simultaneously with said step of inducing said first ring condition.

14. The method of claim 9 wherein each of said steps of inducing said first and second ring conditions includes transmitting a protocol element to a digital phone.

15. The method of claim 9 further comprising a step of enabling call-pickup of an incoming call to said particular phone following said step of inducing said second ring condition.

16. A system for providing off-hook notification for a plurality of individually addressable telephones comprising:
   switching circuitry for routing calls among telephones of a telephone network;

monitor means for monitoring conditions along telecommunications links to said telephones to detect inadvertent off-hook events at said telephones;

memory having stored off-hook notification signals, including first and second ring signals for triggering ringing at said telephones;

first means, connected to said monitor means, for transmitting said first ring signal to a particular telephone in response to detection of an inadvertent off-hook event at said particular telephone; and second means, connected to said monitor means and switching circuitry, for transmitting said second ring signal to said particular phone in response to detection of an incoming call to said particular phone while said inadvertent off-hook event is present.

17. The system of claim 16 wherein said switching circuitry and said monitor means are located at a central office of said telephone network.

18. The system of claim 16 wherein said switching circuitry and said monitor means are elements of a private branch exchange (PBX).

19. The system of claim 16 wherein said memory stores digital protocol elements for exchange with digital telephones.

* * * * *